United States Patent Office 3,669,642
Patented June 13, 1972

3,669,642
ARYLOXY AND ARYLMERCAPTO - N-METHOXY-ETHYLACETAMIDOMONOTHIO AND DITHIO-PHOSPHATES AND PHOSPHONATES AND THEIR UTILITY AS HERBICIDES
Llewellyn W. Fancher, Orinda, and Reed A. Gray, Saratoga, Calif., assignors to Stauffer Chemical Company, New York, N.Y.
No Drawing. Application Oct. 20, 1967, Ser. No. 676,698, now Patent No. 3,520,956, which is a continuation-in-part of application Ser. No. 463,322, June 11, 1965. Divided and this application Mar. 19, 1970, Ser. No. 24,977
Int. Cl. A01n 9/36
U.S. Cl. 71—87   6 Claims

ABSTRACT OF THE DISCLOSURE

Compounds corresponding to the formula

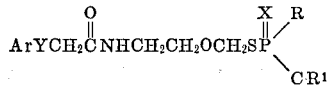

in which X and Y are, independently, oxygen or sulfur, Ar is phenyl, nuclear chlorinated-phenyl, or naphthyl groups, the chlorination is from 1 to 5 chlorine atoms, inclusive, R is lower alkyl or lower alkoxy and $R^1$ is lower alkyl. The naphthyl nuclei are bonded through either the $\alpha$ or $\beta$ nuclear carbon atom. The above compounds are effective herbicides, particularly for the control of grasses and broadleaf plants with both pre-emergence and post-emergence activity.

This application is a division of copending application Ser. No. 676,698, filed Oct. 20, 1967, now U.S. Patent 3,520,956, issued July 21, 1970 which was in turn a continuation-in-part application of then copending application Ser. No. 463,322, filed June 11, 1965, now abandoned.

This invention relates to certain new and novel phosphorus containing organic compounds which may be used as effective herbicides. More specifically, this invention relates to certain substituted aryloxy- and arylmercapto-acetamido-N-methoxyethylmonothio and dithiophosphates and to preparation and utility of said organophosphorus compounds in herbicidal compositions.

The compounds comprising the instant class of compounds correspond to the general formula

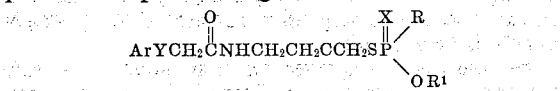

wherein X and Y are selected from the group consisting of oxygen and sulfur. Ar is selected from the group consisting of phenyl, nuclear chlorinated-phenyl, and naphthyl groups, wherein said chlorination is from 1 to 5 chlorine atoms, inclusive, R is lower alkyl or lower alkoxy and $R^1$ is lower alkyl. Said naphthyl nuclei are bonded through either the $\alpha$ or $\beta$ nuclear carbon atom.

As employed in this specification the terms lower alkyl and lower alkoxy preferably include those members of the groups containing from 1 to 6 carbon atoms, inclusive, in either a straight chain or a branched chain configuration, for example, methyl, ethyl, n-propyl, isopropyl, n-butyl, sec-butyl, n-amyl, isoamyl, n-hexyl, and 2-ethylbutyl; methoxy, ethoxy, n-propoxy, isopropoxy, n-butoxy, sec-butoxy n-amoxy, isoamoxy, n-hexyloxy and isohexyloxy.

It is also possible that other nuclearly substituted phenyl and naphthyl compounds be operable within the embodiments of the present invention. Said substituents can be selected from the group consisting of the halogens, hydroxyl, nitro, alkoxy and alkyl groups and various combinations thereof. The method of preparation for the compounds would be substantially the same involving the appropriate substituted-phenoxy acetamide.

The compounds herein contemplated are prepared by various methods. The general method applied in preparing the compounds is first the reaction of the appropriate dialkyl dithio- or monothio phosphoric or phosphonic acid and 37 percent Formalin. This was followed by the condensation of the product thus obtained with the appropriate N-$\beta$-hydroxyethyl-aryloxy or arylmercaptoacetamide in the presence of a stable acid condensation catalyst, such as 2-naphthalene sulfonic acid monohydrate. The reaction proceeds readily in the liquid phase. The incorporation of an organic solvent is also useful, facilitating processing as well as agitation of the reactants. Temperatures that permit operation in the liquid phase and which are between room temperature and the reflux temperature of the solvent, if any is employed, are operable. Preferably the condensation reaction is carried out at reflux temperature, usually at an elevated temperature.

It has been found that the compounds of the present invention are particularly effective as herbicides. They are effective in the control of grasses and broadleaf plants with both pre-emergence and post-emergence activity.

The compounds of the present invention are prepared in accordance with the following typical example.

EXAMPLE

Preparation of 2,4-dichlorophenoxy-N-methoxyethyl acetamido-O,O-dimethylphosphorodithioate This example is representative of the preparation of aryloxy- and arylmercaptoacetamido-N-methoxyethyl derivatives of dialkyl-substituted monothio and dithiophosphoric acid within the embodiment of the present invention.

To 20.6 g. (0.13 M) of dimethyldithiophosphoric acid was added with cooling below 15° C., 11.0 cc. (0.14 M) of 37 percent Formalin. The mixture was transferred to a separatory funnel in which had been placed 10 cc. of saturated aqueous sodium chloride and 100 cc. of benzene. After thorough mixing, the layers were allowed to separate and the bottom aqueous layer reextracted with 50 cc. of benzene. The benzene extractions were combined, dried over anhydrous magnesium sulfate and filtered.

The benzene solution of hydroxymethyl-O,O-dimethyl-phosphorodithioate was placed in a reaction flask equipped with a continuous water extractor. To the reaction flask was added 26.4 g. (0.1 M) of N-$\beta$-hydroxyethyl-2,4-dichlorophenoxyacetamide and 1.0 g. of 2-naphthalene sulfonic acid monohydrate. The mixture was stirred and refluxed until no further water was collected in the water trap; this required about 2 hours. After cooling, the reaction mixture was washed several times with water, dried over anhydrous magnesium sulfate, filtered and the benzene removed on a steam bath. There was obtained 40.5 g. (93% of theory) of the title compound, a viscous liquid, $n_D^{30}=1.5753$.

The following is a table of the compounds prepared according to the aforedescribed procedure. Compound numbers have been assigned to each compound and are used for identification throughout the balance of the application.

TABLE I

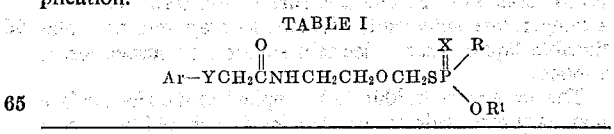

| Compound number | Ar | X | Y | R | $R^1$ | $n_D^{30}$ |
|---|---|---|---|---|---|---|
| 1 | 2,4-dichlorophenyl | S | O | $OCH_3$ | $CH_3$ | 1.5753 |
| 2 | do | S | O | $OC_2H_5$ | $C_2H_5$ | 1.5700 |
| 3 | do | S | O | $O-i-C_3H_7$ | $i-C_3H_7$ | 1.5540 |
| 4 | do | S | O | $OCH_3$ | $i-C_3H_7$ | 1.5686 |
| 5 | 2,4,5-trichlorophenyl | S | O | $OCH_3$ | $CH_3$ | 1.5810 |

| Compound number | Ar | X | Y | R | R¹ | $n_D^{30}$ |
|---|---|---|---|---|---|---|
| 6 | do | S | O | OC₂H₅ | C₂H₅ | 1.5760 |
| 7 | do | S | O | O-i-C₃H₇ | i-C₃H₇ | 1.5555 |
| 8 | p-Chlorophenyl | S | O | OCH₃ | CH₃ | 1.5761 |
| 9 | do | S | O | OC₂H₅ | C₂H₅ | 1.5640 |
| 10 | do | S | O | O-i-C₃H₇ | i-C₃H₇ | 1.5489 |
| 11 | Phenyl | S | O | OCH₃ | CH₃ | 1.5690 |
| 12 | do | S | O | OC₂H₅ | C₂H₅ | 1.5570 |
| 13 | do | S | O | O-i-C₃H₇ | i-C₃H₇ | 1.5419 |
| 14 | p-Chlorophenyl | O | O | OC₂H₅ | C₂H₅ | 1.5403 |
| 15 | 2,4,5-trichlorophenyl | O | O | OC₂H₅ | C₂H₅ | 1.5575 |
| 16 | 2,4-dichlorophenyl | O | O | OC₂H₅ | C₂H₅ | 1.5429 |
| 17 | -Naphthyl | S | O | OCH₃ | CH₃ | 1.6083 |
| 18 | do | S | O | OC₂H₅ | C₂H₅ | 1.5880 |
| 19 | do | S | O | O-i-C₃H₇ | i-C₃H₇ | 1.5772 |
| 20 | do | S | O | OCH₃ | i-C₃H₇ | 1.5888 |
| 21 | α-Naphthyl | S | O | OCH₃ | CH₃ | 1.6246 |
| 22 | do | S | O | O-i-C₃H₇ | i-C₃H₇ | 1.5997 |
| 23 | do | S | O | OCH₃ | i-C₃H₇ | 1.6115 |
| 24 | p-Chlorophenyl | S | S | OC₂H₅ | C₂H₅ | 1.5863 |
| 25 | do | S | S | OCH₃ | CH₃ | 1.6043 |
| 26 | do | O | S | OC₂H₅ | C₂H₅ | 1.5539 |
| 27 | do | S | S | O-i-C₃H₇ | i-C₃H₇ | 1.5596 |
| 28 | Phenyl | O | S | OC₂H₅ | C₂H₅ | 1.5460 |
| 29 | β-Naphthyl | O | S | OC₂H₅ | C₂H₅ | 1.5978 |
| 30 | 2,4-dichlorophenyl | S | O | OC₂H₅ | n-C₃H₇ | 1.5638 |
| 31 | do | S | O | C₂H₅ | i-C₃H₇ | 1.5718 |

¹ Compound No. 1 prepared in the Example.

As previously mentioned, the herein described novel compositions produced in the above described manner are phytotoxic compounds which are useful and valuable in controlling various plant species. The compounds of this invention were tested as herbicides in the following manner.

Pre-emergence herbicide test

The seeds of crabgrass, (*Digitaria sanguinatis* (L.) Scop.), foxtail (*Sataria glauca* (L.) Beauv.) or annual bluegrass (*Poa annua* (L.), watergrass (*Echinochloa crusgalli* (L.) Beauv.) wild oats (*Avena fatua* (L.) or red oats (*Avena sativa*, (L.), pigweed (*Amaranthus retroflexus*, (L.), Indian mustard (*Morassica juncea* (L.), Coss.) and curly dock (*Rumex crispus*, (L.) were planted in individual rows one-half inch deep in Santa Cruz sandy loam soil contained in compressed paper flats 8¼" x 6½" which are 2¾" deep. Enough seeds were planted to give about thirty to fifty plants of each of the weed species in each flat. The flats were watered after planting. The spraying solution is prepared by dissolving 50 mg. of the test compound in 3 ml. of a solvent, such as acetone containing 1% Tween 20® (polyoxy-ethylene sorbitan monolaurate) and diluting with a small amount of water. The following day each flat was sprayed at the rate of 20 pounds of the candidate compound under test in 80 gallons of solution per acre. An atomizer was used to spray the solution on the soil surface. The flats were placed in a greenhouse at 80° F. and watered regularly. Two weeks later the degree of weed control was determined by comparing the amount of germination and growth of each weed in the treated flats with weeds in several untreated control flats. The results of this test are reported in Table II.

Post-emergence herbicide test

The seeds of five weed species, crabgrass (*Digitari sanguinatis* (L.)Scot.), watergrass (*Echinochloa crusgalli* (L.) Beauv.), red oats (*Avera sativa*, (L.) or wild oats (*Avena fatua*, (L.), curly dock (*Rumex crispus*, (L.), mustard (*Borassica juncea* (L.) Coss.) and one crop, pinto beans (*Phaseolus vulgaris*) were planted in individual rows as described in the pre-emergence test, supra. Two weeks after planting the plant foliage was sprayed with a 0.5% solution of the test compounds at a rate equivalent to 12.5 pounds/acre. The treated plants were placed back in the greenhouse. Injury ratings were recorded 14 days after treatment. The rating system is the same as that used in the pre-emergence test. Table III lists the results obtained therefrom.

TABLE III
Post-emergence activity rate 12.5 lbs./acre

| Compound number | Crab-grass | Water-grass | Red oats or wild oats | Curly dock | Mustard | Pinto beans |
|---|---|---|---|---|---|---|
| 1 | ++ | ++ |  | +++ | (+++) | +++ |
| 2 | ++ | ++ | + | +++ | (+++) | +++ |
| 3 |  |  |  | +++ | (+++) | +++ |
| 4 |  |  |  | +++ | (+++) | +++ |
| 5 | + | +++ | ++ | +++ | (+++) | +++ |
| 6 | +++ | +++ | +++ | +++ | (+++) | +++ |
| 7 | + | + | + | +++ | (+++) | +++ |
| 8 | + | +++ |  | +++ | (+++) | +++ |
| 9 | ++ | +++ | ++ | +++ | (+++) | +++ |
| 10 | +++ | +++ | + | +++ | (+++) | +++ |
| 14 | +++ | ++ |  | +++ | +++ | +++ |
| 15 | +++ | +++ | + | +++ | +++ | +++ |
| 16 | +++ | +++ |  | +++ | +++ | +++ |
| 18 |  |  |  | + |  | + |
| 22 |  |  | ++ | ++ | ++ | ++ |
| 23 |  |  |  |  | ++ | +++ |
| 26 |  | ++ |  |  |  | +++ |

+=slight injury.
++=moderate injury.
+++=severe injury or death.
( )=control on Velvetleaf (*Abutilon theophrasti*, Medic.).

The new compounds of the present invention are used as pre-emergence or post-emergence herbicides and are applied in a variety of ways at various concentrations. In practice the compounds are formulated with an inert carrier, utilizing methods well-known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre. One particularly advantageous way of applying the compound is a narrow band along a row crop straddling the row. In practice the compounds are formulated with an inert carrier utilizing methods well-known to those skilled in the art, thereby making them suitable for particular application.

TABLE II
Pre-emergence activity rate 20 lbs./acre

| Compound number | Crab-grass | Foxtail or annual bluegrass | Water grass | Wild oat or red oat | Pig-weed | Mustard | Curly dock |
|---|---|---|---|---|---|---|---|
| 1 | +++ | +++ | +++ | +++ | +++ | +++ | +++ |
| 2 | +++ | +++ | +++ | +++ | +++ | +++ | +++ |
| 3 | +++ | +++ | +++ | +++ | +++ | +++ | +++ |
| 4 | +++ | +++ | +++ | +++ | +++ | +++ | +++ |
| 5 | +++ | +++ | +++ | +++ | +++ | +++ | +++ |
| 6 | +++ | +++ | +++ | ++ | +++ | +++ | +++ |
| 7 | +++ | +++ | +++ |  | +++ | +++ | ++ |
| 8 | +++ | +++ | +++ |  | +++ | +++ | ++ |
| 9 | +++ | +++ |  |  | +++ | +++ | ++ |
| 10 | +++ | +++ |  |  | +++ | +++ | + |
| 11 | + |  |  |  | +++ | + |  |
| 12 | + |  |  |  | +++ |  |  |
| 14 | +++ | +++ | +++ | + | +++ | +++ | +++ |
| 15 | +++ | +++ | +++ | +++ | +++ | +++ | +++ |
| 16 | +++ | +++ | +++ | +++ | +++ | +++ | +++ |
| 18 | + |  |  |  |  |  |  |
| 21 |  |  | + |  | +++ | +++ |  |

+=slight injury.
++=moderate injury.
+++=severe injury or death.

The concentration of a compound of the present invention, constituting an effective amount in best mode of administration in the utility disclosed is readily determinable by those skilled in the art. Various changes and modifications are possible without departing from the spirit and scope of the claims.

What is claimed is:

1. The method of combating weeds comprising applying thereto a phytotoxic amount of a compound having the formula

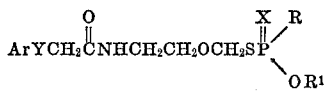

wherein X and Y are selected from the group consisting of oxygen and sulfur, R is selected from the group consisting of lower alkyl and lower alkoxy, $R^1$ is lower alkyl and Ar is a member selected from the group consisting of phenyl, naphthyl and nuclear chlorinated-phenyl groups, wherein said nuclear chlorination is from 1 to 5 chlorine atoms, inclusive.

2. A method of combating weeds according to claim 1 in which X is sulfur, Y is oxygen, R is methoxy, $R^1$ is methyl and Ar is 2,4-dichlorophenyl.

3. A method of combating weeds according to claim 1 in which X is sulfur, Y is oxygen, R is methoxy, $R^1$ is ethyl and Ar is 2,4,5-trichlorophenyl.

4. A method of combating weeds according to claim 1 in which X is sulfur, Y is oxygen, R is methoxy, $R^1$ is methyl and Ar is p-chlorophenyl.

5. A method of combating weeds according to claim 1 in which X is oxygen, Y is oxygen, R is ethoxy, $R^1$ is ethyl and Ar is p-chlorophenyl.

6. A method of combating weeds according to claim 1 in which X is oxygen, Y is oxygen, R is ethoxy, $R^1$ is ethyl and Ar is 2,4-dichlorophenyl.

References Cited

UNITED STATES PATENTS

| | | | |
|---|---|---|---|
| 3,372,210 | 3/1968 | Gutman et al. | 71—87 |
| 3,197,496 | 7/1965 | Le Suer | 71—87 |
| 2,577,969 | 12/1951 | Jones | 71—118 |
| 2,453,983 | 11/1948 | Sexton et al. | 71—98 |

FOREIGN PATENTS

| | | | |
|---|---|---|---|
| 637 | 1/1965 | Japan | 71—87 |

OTHER REFERENCES

Johnston: "The Relationship of Structure to Activity etc." (1961), Biochem, J., 82, pp. 425–28 (1962).

LEWIS GOTTS, Primary Examiner

G. HOLLRAH, Assistant Examiner

U.S. Cl. X.R.

71—98